(12) United States Patent
Wong et al.

(10) Patent No.: US 12,040,874 B2
(45) Date of Patent: Jul. 16, 2024

(54) METHOD AND APPARATUS FOR TESTING DISAGGREGATED COMPONENTS OF A RADIO ACCESS NETWORK

(71) Applicant: VIAVI Solutions Inc., Chandler, AZ (US)

(72) Inventors: Ian Wong, Austin, TX (US); Ken Trudgeon, Victoria (CA); Patrick Charriere, Letcombe Regis (GB)

(73) Assignee: VIAVI Solutions Inc., Chandler, AZ (US)

( * ) Notice: Subject to any disclaimer, the term of this patent is extended or adjusted under 35 U.S.C. 154(b) by 154 days.

(21) Appl. No.: 17/884,831

(22) Filed: Aug. 10, 2022

(65) Prior Publication Data

US 2023/0045847 A1 Feb. 16, 2023

Related U.S. Application Data

(60) Provisional application No. 63/260,195, filed on Aug. 12, 2021.

(51) Int. Cl.
*H04B 7/08* (2006.01)
*H04B 17/391* (2015.01)
*H04W 24/10* (2009.01)
*H04W 72/044* (2023.01)
*H04W 72/21* (2023.01)

(52) U.S. Cl.
CPC ......... *H04B 7/086* (2013.01); *H04B 17/3912* (2015.01); *H04W 24/10* (2013.01); *H04W 72/046* (2013.01); *H04W 72/21* (2023.01)

(58) Field of Classification Search
CPC .. H04B 7/086; H04B 17/3912; H04B 7/0617; H04B 17/12; H04W 24/10; H04W 72/046; H04W 72/21; H04W 24/06; H04W 88/085
See application file for complete search history.

(56) References Cited

U.S. PATENT DOCUMENTS

2023/0085020 A1* 3/2023 James .................. H04W 24/08
455/424
2023/0336261 A1* 10/2023 Chen ...................... H04B 17/40

OTHER PUBLICATIONS

"3rd Generation Partnership Project; Technical Specification Group Radio Access Network; Evolved Universal Terrestrial Radio Access (E-UTRA); Base Station (BS) conformance testing (Release 17)," 3GPP TS 36.141 V17.5.0, Mar. 2022, 506 Pages.
"3rd Generation Partnership Project; Technical Specification Group Radio Access Network; NR; Base Station (BS) conformance testing Part 1: Conducted conformance testing (Release 15)," 3GPP TS 38.141-1 V15.8.0, Mar. 2021, 220 Pages.
"O-RAN Fronthaul Working Group Conformance Test Specification," O-RAN.WG4.CONF.0-v04.00.00, 2021, 354 Pages.

* cited by examiner

*Primary Examiner* — Vineeta S Panwalkar
(74) *Attorney, Agent, or Firm* — Harrity & Harrity, LLP

(57) ABSTRACT

A device may receive sequential digital signals generated by a radio unit based on receipt of sequential radio frequency waveforms provided to ports of the radio unit by a signal generator and analyzer. The device may calculate uplink direction beamforming performance of the radio unit based on the sequential digital signals. The device may provide data identifying the uplink direction beamforming performance for display.

20 Claims, 13 Drawing Sheets

METHOD AND APPARATUS FOR TESTING DISAGGREGATED COMPONENTS OF A RADIO ACCESS NETWORK

CROSS-REFERENCE TO RELATED APPLICATION

This Patent Application claims priority to Provisional Patent Application No. 63/260,195, filed on Aug. 12, 2021, and entitled "METHOD AND APPARATUS FOR TESTING DISAGGREGATED COMPONENTS OF A RADIO ACCESS NETWORK." The disclosure of the prior Application is considered part of and is incorporated by reference into this Patent Application.

BACKGROUND

A fully disaggregated radio access network (RAN) may include a base station with separate components, such as a centralized unit (CU), a distributed unit (DU), and a radio unit (RU). In a disaggregated RAN, where the RU is potentially manufactured by a different vendor than the DU, it is highly inefficient to always need to test an aggregate performance of the base station made up of an RU-DU pair.

SUMMARY

Some implementations described herein relate to a method. The method may include receiving sequential digital signals generated by a radio unit based on receipt of sequential radio frequency waveforms provided to ports of the radio unit by a signal generator and analyzer. The method may include calculating uplink direction beamforming performance of the radio unit based on the sequential digital signals, and providing data identifying the uplink direction beamforming performance for display.

Some implementations described herein relate to a device. The device may include one or more memories and one or more processors coupled to the one or more memories. The one or more processors may be configured to receive sequential digital signals generated by a radio unit based on receipt of sequential radio frequency waveforms provided to ports of the radio unit by a signal generator and analyzer. The one or more processors may be configured to calculate uplink direction beamforming performance of the radio unit based on the sequential digital signals. The one or more processors may be configured to generate a performance report based on the uplink direction beamforming performance, and provide the performance report for display.

Some implementations described herein relate to a non-transitory computer-readable medium that stores a set of instructions for a device. The set of instructions, when executed by one or more processors of the device, may cause the device to receive sequential digital signals generated by a radio unit based on receipt of sequential radio frequency waveforms provided to ports of the radio unit by a signal generator and analyzer. The radio unit may include one of a beamforming radio unit or a channel information-based beamforming radio unit. The set of instructions, when executed by one or more processors of the device, may cause the device to calculate uplink direction beamforming performance of the radio unit based on the sequential digital signals. The set of instructions, when executed by one or more processors of the device, may cause the device to provide data identifying the uplink direction beamforming performance for display.

DETAILED DESCRIPTION

Figure 1A:
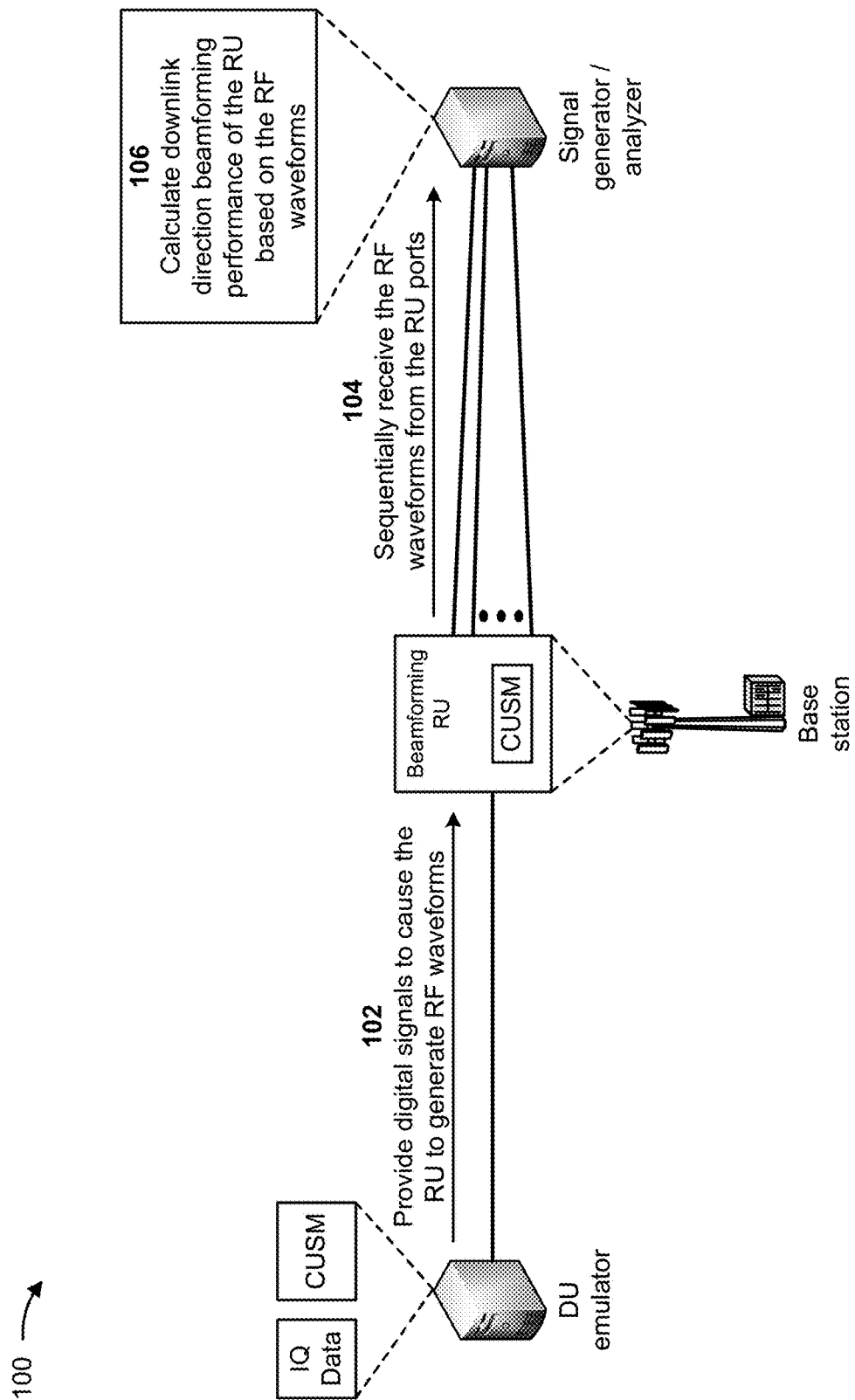
FIGS. 1A-1J are diagrams of an example implementation described herein.

The following detailed description of example implementations refers to the accompanying drawings. The same reference numbers in different drawings may identify the same or similar elements.

The current trend toward RAN disaggregation with multi-vendor RU-DU pairs means that in order to ensure adequate performance and interoperability, tests need to be conducted for different combinations of products (e.g., RUs and DUs), versions of products, hardware, software, and/or the like, manufactured by different vendors. Such testing is time consuming, inefficient, prone to error, and expensive. In some cases, RAN disaggregation may result in an increase in a quantity of RU vendors and/or manufacturers. However, the RU vendors may be unable to pre-test the RUs without a DU partner (e.g., a vendor or manufacturer of DUs). Therefore, current techniques for testing RUs consume computing resources (e.g., processing resources, memory resources, communication resources, and/or the like), networking resources, and/or the like associated with conducting tests for different combinations of RUs and DUs and/or different versions of RUs and DUs, generating incorrect test results based on the tests, identifying the incorrect test results and correcting the tests, implementing RUs with interoperability issues with DUs based on the incorrect test results, and/or the like.

Some implementations described herein relate to a testing system (e.g., a DU emulator and a signal generator/analyzer) that tests disaggregated components of a RAN. For example, the DU emulator may receive sequential digital signals generated by a radio unit based on receipt of sequential radio frequency waveforms provided to ports of the radio unit by a signal generator and analyzer. The DU emulator may calculate uplink direction beamforming performance of the radio unit based on the sequential digital signals. The DU emulator may generate a performance report based on the uplink direction beamforming performance, and may provide the performance report for display.

In this way, the testing system tests disaggregated components of a RAN. The testing system may test an RU in isolation to enable verification of conformance, interoperability, and performance of the RU, and to enable early detection of errors and an increased likelihood of passing further tests when a DU-RU pair is tested together. For testing RU beamforming conformance and performance, a single-port signal analyzer/generator may be used, together with a tunable DU emulator that can stimulate each branch of a multi-port RU while still effectively testing the beamforming performance. For testing RF performance requirements of the RU, the DU emulator may include a tunable performance model that enables the DU emulator to draw performance curves related to the RU contribution to the overall combined base station performance. For testing interoperability of the RU with various DUs associated with multiple different vendors and/or manufacturers, the DU emulator may be configured to mimic or simulate the behavior of commercial DUs to identify interoperability issues that may arise when the actual DU and RU pair is tested. This, in turn, conserves computing resources, networking resources, and/or the like that would otherwise have been consumed in conducting tests for different combinations of RUs and DUs and/or different versions of RUs and DUs, generating incorrect test results based on the tests, identifying the incorrect test results and correcting the tests, implementing RUs with interoperability issues with DUs based on the incorrect test results, and/or the like.

FIGS. 1A-1J are diagrams of an example 100 associated with testing disaggregated components of a RAN. As shown in FIGS. 1A-1J, example 100 includes a mobile radio environment associated with a testing system. The mobile radio environment may include multiple base stations communicating with multiple user devices. Further details of the base stations, the user devices, and the testing system are provided elsewhere herein.

Figure 1B:
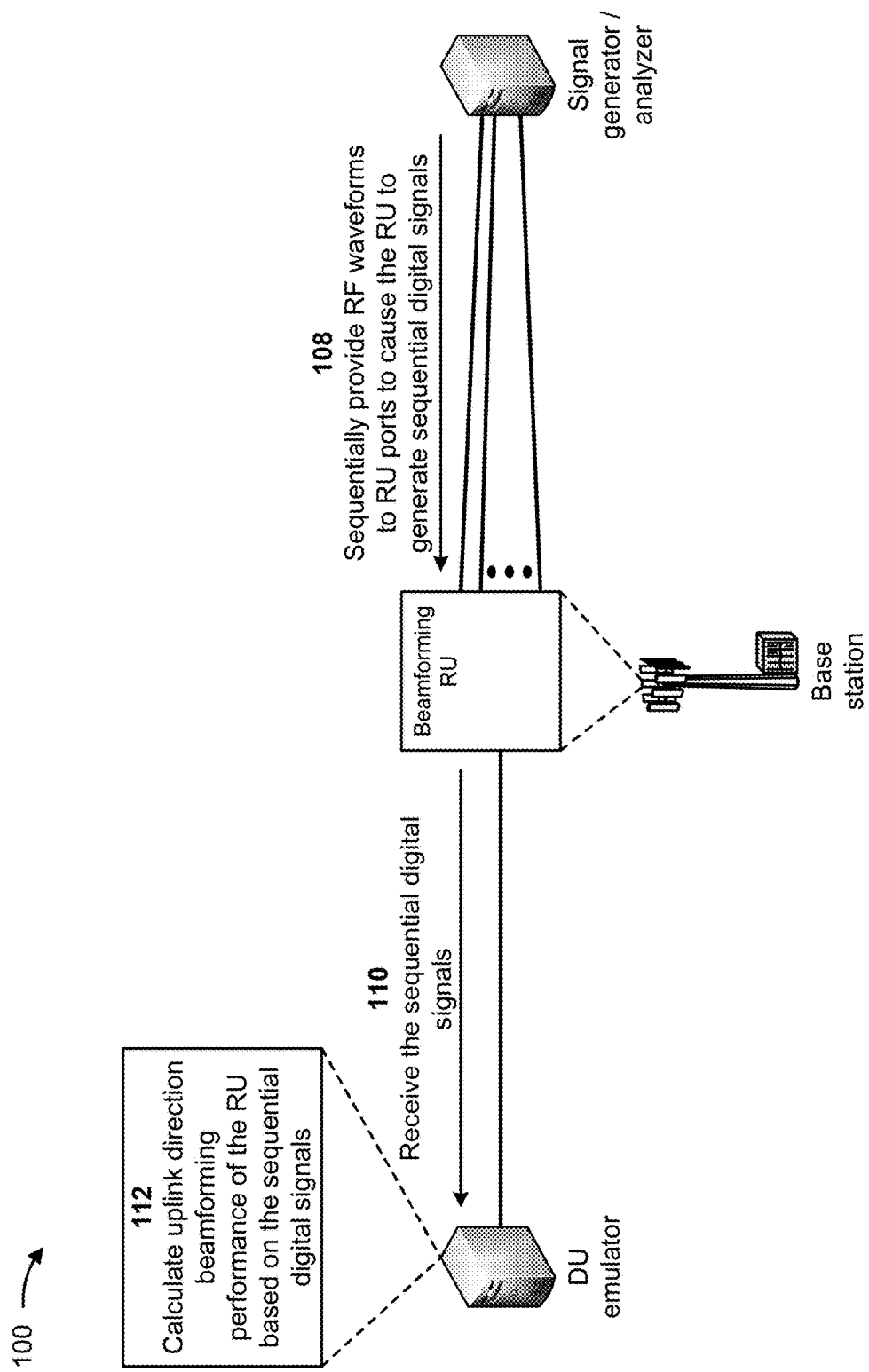

FIGS. 1A and 1B depict a testing system for testing a beamforming RU associated with a base station. The testing system may include a DU emulator and a signal generator/analyzer. The beamforming RU and the DU emulator may include control, user, synchronization, and management (CUSM) planes and may interconnect via an optical fronthaul interface. The DU emulator may generate and analyze data (e.g., in-phase and quadrature (IQ) data) in a frequency domain. The DU emulator may cause each port of the multi-port RU to generate radio frequency (RF) signals to effectively test beamforming performance of the RU. The signal generator/analyzer may include multiple ports that communicate with the RU when testing the RU. Such an arrangement may be more cost effective than a test that emulates an RF signal environment by generating/analyzing the RF signals simultaneously for each port of the RU.

As shown in FIG. 1A, and by reference number 102, the DU emulator may provide digital signals to cause the RU to generate RF waveforms (e.g., beams). For example, the DU emulator may generate digital signals that cause the RU to generate calibrated gains and phases for beams in certain directions, for beam patterns that can simultaneously increase a gain in a certain direction while nulling out interference from another direction, and/or the like. The DU emulator may provide the digital signals to the RU and the RU may receive the digital signals. The digital signals may cause the RU to generate (e.g., via multiple transmit antennas) RF waveforms (e.g., beams) in certain directions, RF waveform patterns (e.g., beam patterns) that can simultaneously increase a gain in a certain direction while nulling out interference from another direction, and/or the like.

As further shown in FIG. 1A, and by reference number 104, the signal generator/analyzer may sequentially receive the RF waveforms from the RU ports (e.g., multiple receive antennas). For example, based on the digital signals, the RU may sequentially generate an RF waveform for each port of the multi-port RU. The signal generator/analyzer may sequentially receive each RF waveform from each port of the RU, and may analyze the RF waveforms. The RF waveforms may simulate downlink signaling (e.g., from the RU to a user equipment (UE)).

As further shown in FIG. 1A, and by reference number 106, the signal generator/analyzer may calculate downlink direction beamforming performance of the RU based on the RF waveforms. For example, the signal generator/analyzer may analyze the RF waveforms, and may calculate the downlink direction beamforming performance of the RU based on analyzing the RF waveforms. In some implementations, the downlink direction beamforming performance may include characteristics of the RF waveforms, such as gain, directivity, efficiency, side lobe ratios, transmitted power of the RU, sensitivity of the RU, an error vector magnitude (EVM) measure, blocking, selectivity, spurious emissions, and/or the like.

As shown in FIG. 1B, and by reference number 108, the signal generator/analyzer may sequentially provide RF waveforms to RU ports to cause the RU to generate sequential digital signals. For example, the signal generator/analyzer may generate RF waveforms (e.g., beams) in certain directions, RF waveform patterns (e.g., beam patterns) that can simultaneously increase a gain in a certain direction while nulling out interference from another direction, and/or the like. The signal generator/analyzer may sequentially provide the RF waveforms to the ports (e.g., multiple receive antennas) of the RU. The RF waveforms may cause the RU to generate sequential digital signals indicating calibrated gains and phases for the RF waveforms in certain directions, for RF waveform patterns that can simultaneously increase a gain in a certain direction while nulling out interference from another direction, and/or the like.

As further shown in FIG. 1B, and by reference number 110, the DU emulator may receive the sequential digital signals. For example, the RU may provide the sequential digital signals to the DU emulator and the DU emulator may receive the sequential digital signals. The sequential digital signals may provide an indication of uplink signaling (e.g., from a UE to the RU).

As further shown in FIG. 1B, and by reference number 112, the DU emulator may calculate uplink direction beamforming performance of the RU based on the sequential digital signals. For example, the DU emulator may analyze the sequential digital signals, and may calculate the uplink direction beamforming performance of the RU based on analyzing the sequential digital signals. In some implementations, the uplink direction beamforming performance may include characteristics of the RF waveforms generated by the signal generator/analyzer, such as gain, directivity, efficiency, side lobe ratios, transmitted power of the UE, sensitivity of the UE, an EVM measure, blocking, selectivity, spurious emissions, and/or the like.

Figure 1C:
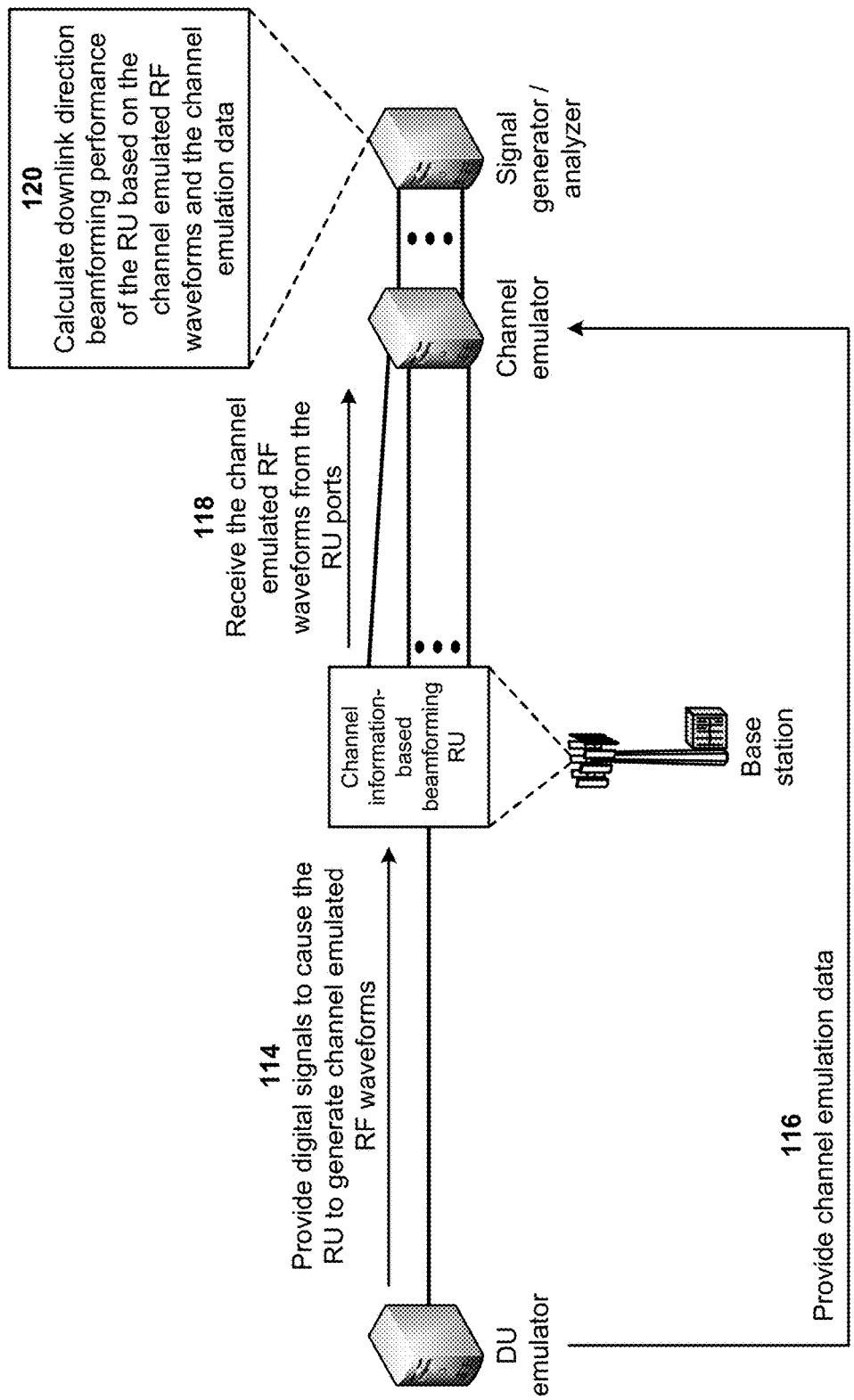
Figure 1D:
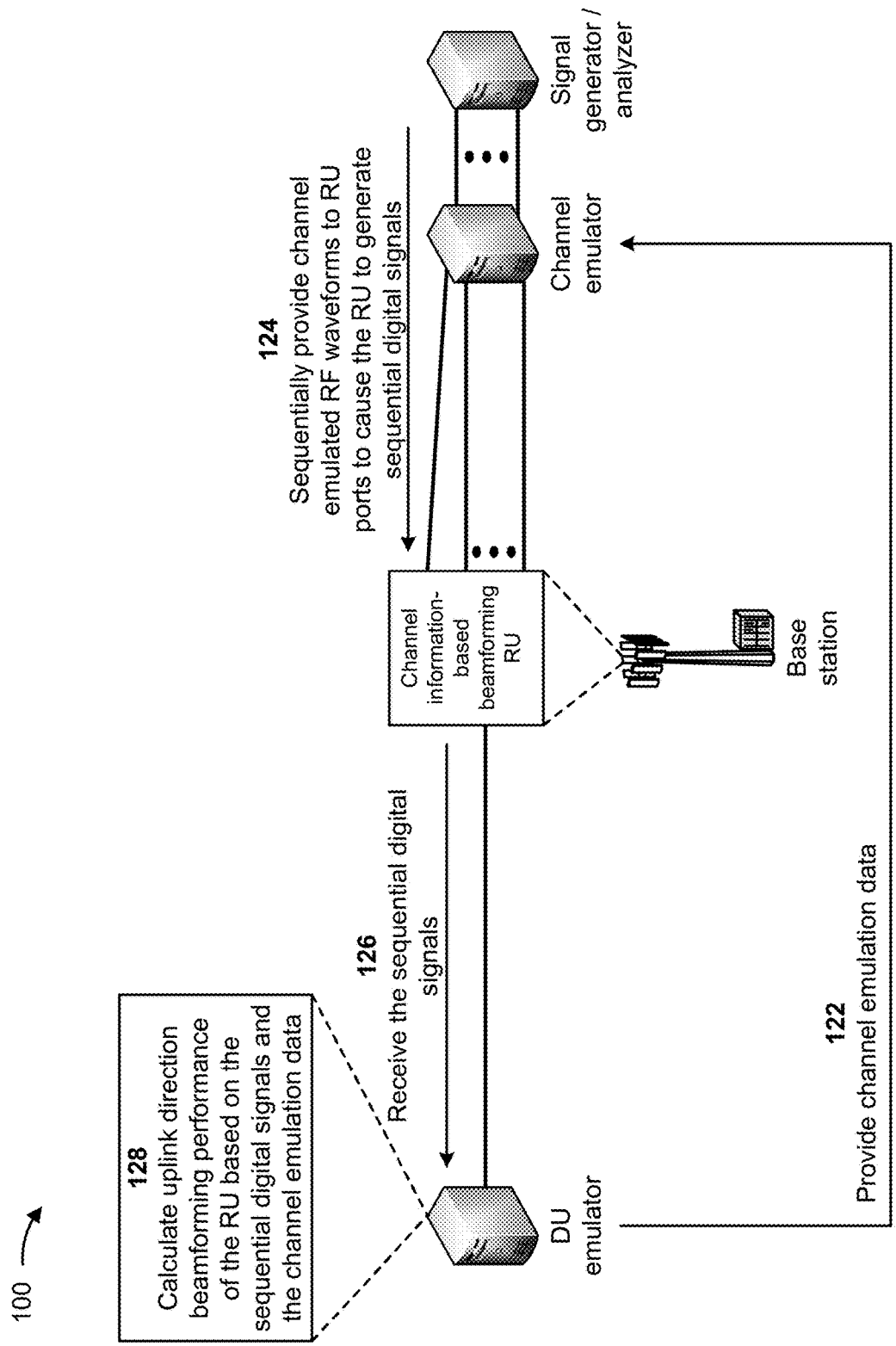

FIGS. 1C and 1D depict a testing system for testing the beamforming RU associated with the base station. The testing system may include the DU emulator and the signal generator/analyzer, as described above. However, the testing system may also include a channel emulator associated with the signal generator/analyzer. The channel emulator is provided for an RU that supports channel information-based beamforming. The channel emulator may provide channel emulation in order to verify the functionality of the RU that supports channel information-based beamforming.

As shown in FIG. 1C, and by reference number 114, the DU emulator may provide digital signals to cause the RU to generate channel emulated RF waveforms. For example, the DU emulator may generate digital signals that cause the RU to generate channel emulated RF waveforms with calibrated gains and phases for beams in certain directions, for beam patterns that can simultaneously increase a gain in a certain direction while nulling out interference from another direction, and/or the like. The DU emulator may provide the digital signals to the RU and the RU may receive the digital signals. The digital signals may cause the RU to generate (e.g., via multiple transmit antennas) channel emulated RF waveforms (e.g., beams) in certain directions, channel emulated RF waveform patterns (e.g., beam patterns) that can simultaneously increase a gain in a certain direction while nulling out interference from another direction, and/or the like.

As further shown in FIG. 1C, and by reference number 116, the DU emulator may provide channel emulation data to the channel emulator. For example, the DU emulator may generate channel emulation data associated with the digital signals provided to the RU. The channel emulation data may include data identifying channel emulation (e.g., a faded representation of a transmitted signal) associated with each of the channel emulated RF waveforms to be generated by the RU. The DU emulator may provide the channel emulation data to the channel emulator before providing the digital signals to the RU, simultaneously with providing the digital signals to the RU, or after providing the digital signals to the RU.

As further shown in FIG. 1C, and by reference number 118, the channel emulator may receive the channel emulated RF waveforms from the RU ports. For example, based on the digital signals, the RU may sequentially generate a channel emulated RF waveform for each port of the multi-port RU. The channel emulator may sequentially receive each channel emulated RF waveform from each port of the RU, and may analyze the channel emulated RF waveforms. The channel emulated RF waveforms may simulate downlink signaling (e.g., from the RU to a UE).

As further shown in FIG. 1C, and by reference number 120, the signal generator/analyzer may calculate downlink direction beamforming performance of the RU based on the channel emulated RF waveforms and the channel emulation data. For example, the channel emulator may convert the channel emulated RF waveforms to RF waveforms based on the channel emulation data. The channel emulator may provide the RF waveforms to the signal generator/analyzer. The signal generator/analyzer may analyze the RF waveforms, and may calculate the downlink direction beamforming performance of the RU based on analyzing the RF waveforms. In some implementations, the downlink direction beamforming performance may include characteristics of the RF waveforms, such as gain, directivity, efficiency, side lobe ratios, transmitted power of the RU, sensitivity of the RU, an EVM measure, blocking, selectivity, spurious emissions, and/or the like.

As shown in FIG. 1D, and by reference number 122, the DU emulator may provide channel emulation data to the channel emulator. For example, the DU emulator may generate channel emulation data associated with channel emulated RF waveforms to be provided to the RU. The channel emulation data may include data identifying channel emulation (e.g., a faded representation of a transmitted signal) associated with each of the channel emulated RF waveforms to be provided to the RU.

As further shown in FIG. 1D, and by reference number 124, the signal generator/analyzer may sequentially provide channel emulated RF waveforms to RU ports to cause the RU to generate sequential digital signals. For example, the signal generator/analyzer may generate RF waveforms (e.g., beams) in certain directions, RF waveform patterns (e.g., beam patterns) that can simultaneously increase a gain in a certain direction while nulling out interference from another direction, and/or the like. The signal generator/analyzer may provide the RF waveforms to the channel emulator. The channel emulator may generate the channel emulated RF waveforms based on the RF waveforms and the channel emulation data. The channel emulator may sequentially provide the channel emulated RF waveforms to the ports (e.g., multiple receive antennas) of the RU. The channel emulated RF waveforms may cause the RU to generate sequential digital signals indicating calibrated gains and phases for the channel emulated RF waveforms in certain directions, for channel emulated RF waveform patterns that can simultaneously increase a gain in a certain direction while nulling out interference from another direction, and/or the like.

As further shown in FIG. 1D, and by reference number 126, the DU emulator may receive the sequential digital signals. For example, the RU may provide the sequential digital signals to the DU emulator and the DU emulator may receive the sequential digital signals. The sequential digital signals may provide an indication of uplink signaling (e.g., from a UE to the RU).

As further shown in FIG. 1D, and by reference number 128, the DU emulator may calculate uplink direction beamforming performance of the RU based on the sequential digital signals and the channel emulation data. For example, the DU emulator may analyze the sequential digital signals and the channel emulation data, and may calculate the uplink direction beamforming performance of the RU based on analyzing the sequential digital signals and the channel emulation data. In some implementations, the uplink direction beamforming performance may include characteristics of the channel emulated RF waveforms generated by the signal generator/analyzer, such as gain, directivity, efficiency, side lobe ratios, transmitted power of the UE, sensitivity of the UE, an EVM measure, blocking, selectivity, spurious emissions, and/or the like.

Figure 1E:
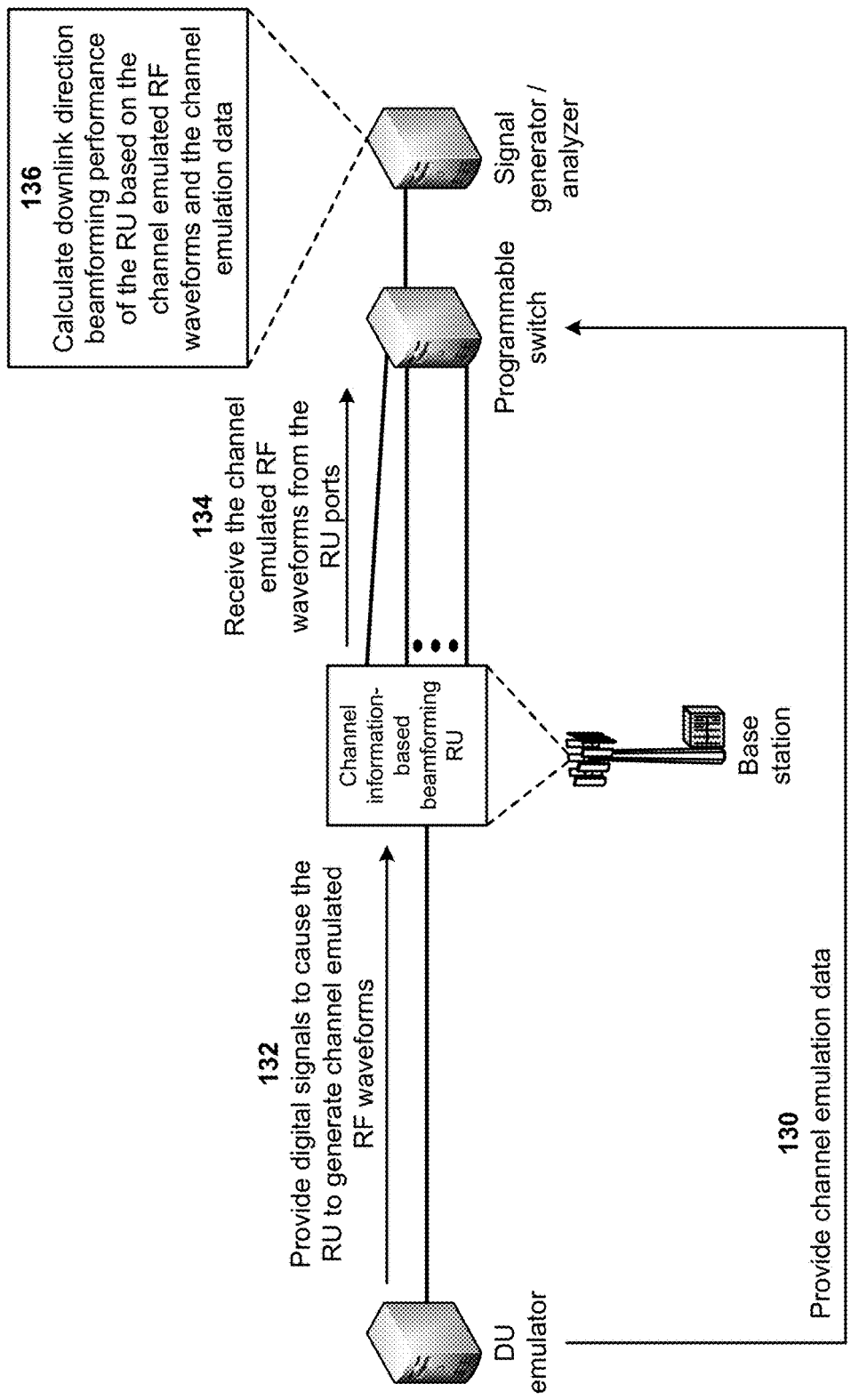
Figure 1F:
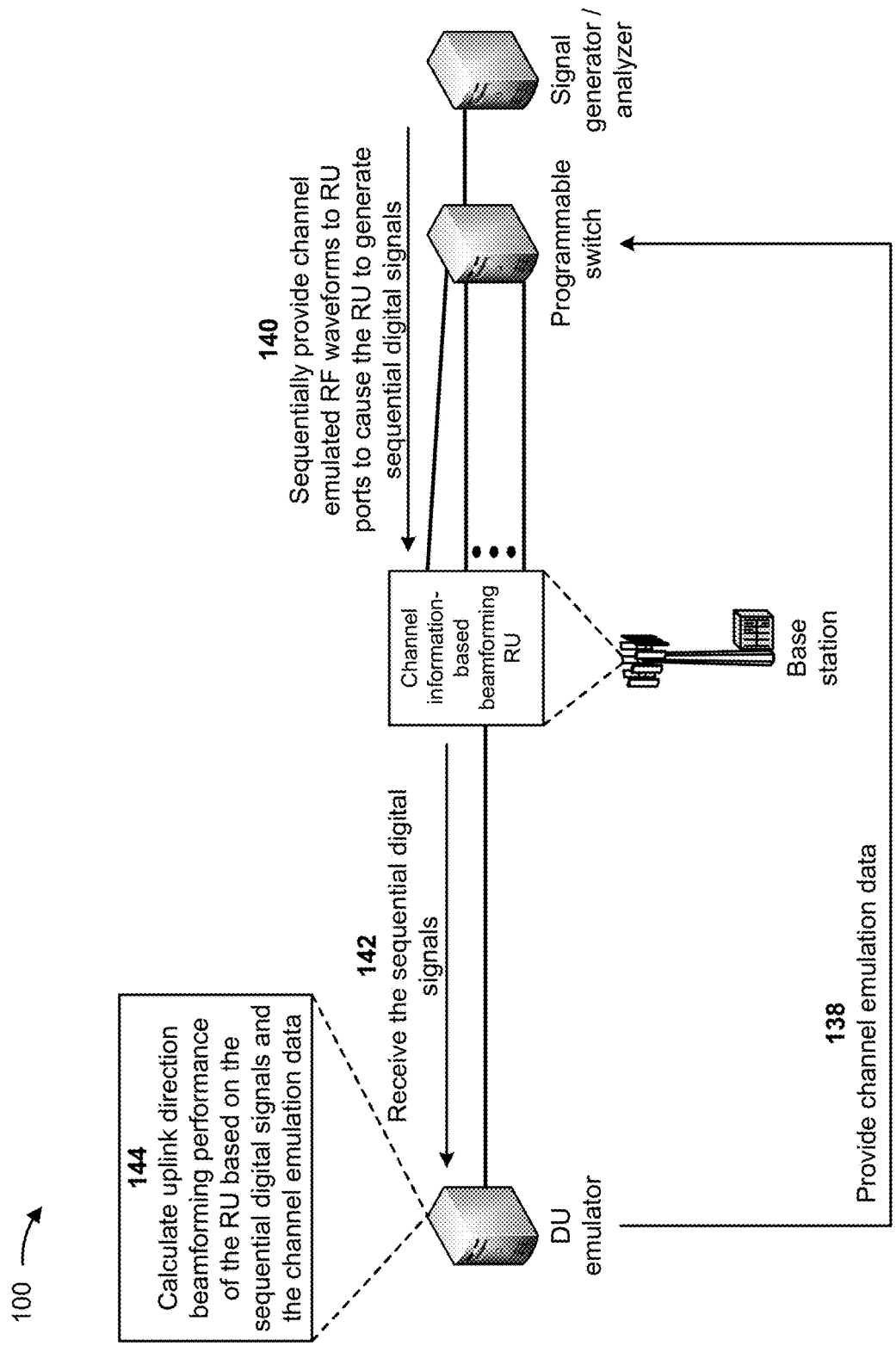

FIGS. 1E and 1F depict a testing system for testing the beamforming RU associated with the base station. The testing system may include the DU emulator and the signal generator/analyzer, as described above. However, the testing system may also include a programmable switch associated with the signal generator/analyzer. One of the biggest cost drivers for tests are a quantity of RF ports needed for the signal generator/analyzer since beamforming RUs may have as many as sixty-four or more transmit/receive ports. To reduce such costs, the signal generator/analyzer may include a single port communicating with the programmable switch. The programmable switch may a port that switches between communicating with the ports of the RU when testing the RU. Such an arrangement may be more cost effective, without compromising test integrity, and may be utilized with different types of beamforming RUs (e.g., a predefined RU, a weight-based RU, an attribute-based RU, a channel information-based beamforming RU, and/or the like).

As shown in FIG. 1E, and by reference number 130, the DU emulator may provide channel emulation data to the programmable switch. For example, the DU emulator may generate channel emulation data associated with digital signals to be provided to the RU. The channel emulation data may include data identifying channel emulation (e.g., a faded representation of a transmitted signal) associated with each channel emulated RF waveform to be generated by the RU. The DU emulator may provide the channel emulation data to the programmable switch before providing the digital signals to the RU, simultaneously with providing the digital signals to the RU, or after providing the digital signals to the RU.

As further shown in FIG. 1E, and by reference number 132, the DU emulator may provide digital signals to cause the RU to generate channel emulated RF waveforms. For example, the DU emulator may generate digital signals that cause the RU to generate channel emulated RF waveforms with calibrated gains and phases for beams in certain directions, for beam patterns that can simultaneously increase a gain in a certain direction while nulling out interference from another direction, and/or the like. The DU emulator may provide the digital signals to the RU and the RU may receive the digital signals. The digital signals may cause the RU to generate (e.g., via multiple transmit antennas) channel emulated RF waveforms (e.g., beams) in certain directions, channel emulated RF waveform patterns (e.g., beam patterns) that can simultaneously increase a gain in a certain direction while nulling out interference from another direction, and/or the like.

As further shown in FIG. 1E, and by reference number 134, the programmable switch may receive the channel emulated RF waveforms from the RU ports. For example, based on the digital signals, the RU may sequentially generate a channel emulated RF waveform for each port of the multi-port RU. The programmable switch may sequentially receive each channel emulated RF waveform from each port of the RU, and may analyze the channel emulated RF waveforms. The channel emulated RF waveforms may simulate downlink signaling (e.g., from the RU to a UE).

As further shown in FIG. 1E, and by reference number 136, the signal generator/analyzer may calculate downlink direction beamforming performance of the RU based on the channel emulated RF waveforms and the channel emulation data. For example, the programmable switch may convert the channel emulated RF waveforms to RF waveforms based on the channel emulation data. The programmable switch may sequentially provide each of the RF waveforms to the signal generator/analyzer (e.g., via the single port). The signal generator/analyzer may analyze the RF waveforms, and may calculate the downlink direction beamforming performance of the RU based on analyzing the RF waveforms. In some implementations, the downlink direction beamforming performance may include characteristics of the RF waveforms, such as gain, directivity, efficiency, side lobe ratios, transmitted power of the RU, sensitivity of the RU, an EVM measure, blocking, selectivity, spurious emissions, and/or the like.

As shown in FIG. 1F, and by reference number 138, the DU emulator may provide channel emulation data to the programmable switch. For example, the DU emulator may generate channel emulation data associated with channel emulated RF waveforms to be provided to the RU. The channel emulation data may include data identifying channel emulation (e.g., a faded representation of a transmitted signal) associated with each of the channel emulated RF waveforms to be provided to the RU.

As further shown in FIG. 1F, and by reference number 140, the signal generator/analyzer may sequentially provide channel emulated RF waveforms to RU ports to cause the RU to generate sequential digital signals. For example, the signal generator/analyzer may generate RF waveforms (e.g., beams) in certain directions, RF waveform patterns (e.g., beam patterns) that can simultaneously increase a gain in a certain direction while nulling out interference from another direction, and/or the like. The signal generator/analyzer may sequentially provide the RF waveforms to the programmable switch. The programmable switch may generate the channel emulated RF waveforms based on the RF waveforms and the channel emulation data. The programmable switch may sequentially provide the channel emulated RF waveforms to the ports (e.g., multiple receive antennas) of the RU. The channel emulated RF waveforms may cause the RU to generate sequential digital signals indicating calibrated gains and phases for the channel emulated RF waveforms in certain directions, for channel emulated RF waveform patterns that can simultaneously increase a gain in a certain direction while nulling out interference from another direction, and/or the like.

As further shown in FIG. 1F, and by reference number 142, the DU emulator may receive the sequential digital signals. For example, the RU may provide the sequential digital signals to the DU emulator and the DU emulator may receive the sequential digital signals. The sequential digital signals may provide an indication of uplink signaling (e.g., from a UE to the RU).

As further shown in FIG. 1F, and by reference number 144, the DU emulator may calculate uplink direction beamforming performance of the RU based on the sequential digital signals and the channel emulation data. For example, the DU emulator may analyze the sequential digital signals and the channel emulation data, and may calculate the uplink direction beamforming performance of the RU based on analyzing the sequential digital signals and the channel emulation data. In some implementations, the uplink direction beamforming performance may include characteristics of the channel emulated RF waveforms generated by the signal generator/analyzer, such as gain, directivity, efficiency, side lobe ratios, transmitted power of the UE, sensitivity of the UE, an EVM measure, blocking, selectivity, spurious emissions, and/or the like.

In the downlink direction RU beamforming tests described above, except for channel information-based beamforming, a passing criterion for a downlink test may include verifying that magnitude and phase relations at the ports (or connectors) of the RU (e.g., which may be utilized to determine beam direction) match an RU specification of a beam under test. By keeping an RU configuration for a particular beam direction under test, and keeping a temperature stable throughout a duration of a test so as not to encounter significant phase drift, the programmable switch may be set to a first port of the RU and may store a received IQ signal ($x_1$) in a memory associated with the signal generator/analyzer. The programmable switch may be set to the other ports of the RU to acquire signals ($x_n$) and the signal generator/analyzer may compute a magnitude and phase difference of $x_n$ with $x_1$ to verify that a beam direction corresponding to the magnitude and phase differences match a beam under test.

In the uplink direction RU beamforming tests, except for channel information-based beamforming, a passing criterion for an uplink test may be more complicated. The signal generator/analyzer may emulate uplink signals that are received from various directions, and the DU emulator may analyze an uplink signal quality of the various signals and may verify that a signal with a best quality emanated from a configured beamforming direction of the RU. An uplink signal corresponding to a direction i may be represented as a length N vector $x=[x_1, x_2, \ldots, x_N]$ and a beamformed receive signal may be represented as $y=Wx$, where W is a beamforming matrix. A signal received by an antenna array of the RU from a particular direction may manifest as variations in magnitude and phase in each antenna element. Hence, this can also be emulated by a single-channel signal generator/analyzer that cycles through varying magnitudes and phases that the programmable switch imparts onto each of the ports of the RU, while all of the other ports of the RU should not receive a signal. A signal vector at a time instance n, where an nth branch is active, may be represented as $x_n=[0, \ldots, 0, x_n, 0, \ldots, 0]$.

A receive beamforming function of the RU may apply a linear combination denoted by the beamforming matrix W of the received signals from each antenna, so an effective signal received for each instance may be from an active antenna, and all other signals are effectively zero. The DU emulator may perform a summation of the signals sequentially to form an aggregate received signal:

$$y = \sum_{n=0}^{N-1} Wx_n = \sum_{n=0}^{N-1} w_n x_n = Wx,$$

where $w_n$ is an nth column of the beamforming matrix W which is kept constant across the sequence. Since phase and magnitude variations over time for the RU and the DU emulator may be negligible compared to actual phase and magnitude differences for emulating different directions, y may represent the beamforming function that is spread over time.

For a channel information based beamforming RU, a complication may arise since the RU implements a precoding function directly inside the RU by using a channel information matrix provided by the DU emulator. Thus, the only way to verify that the RU performed the precoding function correctly is to assume a certain channel information matrix is provided to the RU by the DU emulator, emulate the certain channel information matrix, and verify that data is received correctly. A similar approach may be applied where the programmable switch is utilized to sequentially go through each port of the RU and the channel information matrix is sequentially applied before the analysis is performed. The approach may be similar to the non-channel information-based beamforming RUs, except that before analyzing a signal in the downlink direction, a channel information vector corresponding to each of the ports of the RU is also sequentially applied. In the uplink direction, an emulated uplink signal may be pre-applied with the channel information matrix before the signal is sequentially summed and analyzed.

FIGS. 1G-1J depict a testing system for testing RF/demodulation performance requirements. The testing system may include the DU emulator and the signal generator/analyzer, as described above. However, the channel emulator may be incorporated within the signal generator/analyzer, and the DU emulator may utilize a tunable performance model in order to generate performance curves related to a contribution of the RU to an overall combined base station performance. Specific parameters for the tunable performance model may include variable channel decoder iterations, variable bit widths for the soft information, variable filter lengths/types for varying channel estimation performance, and/or the like.

Figure 1G:
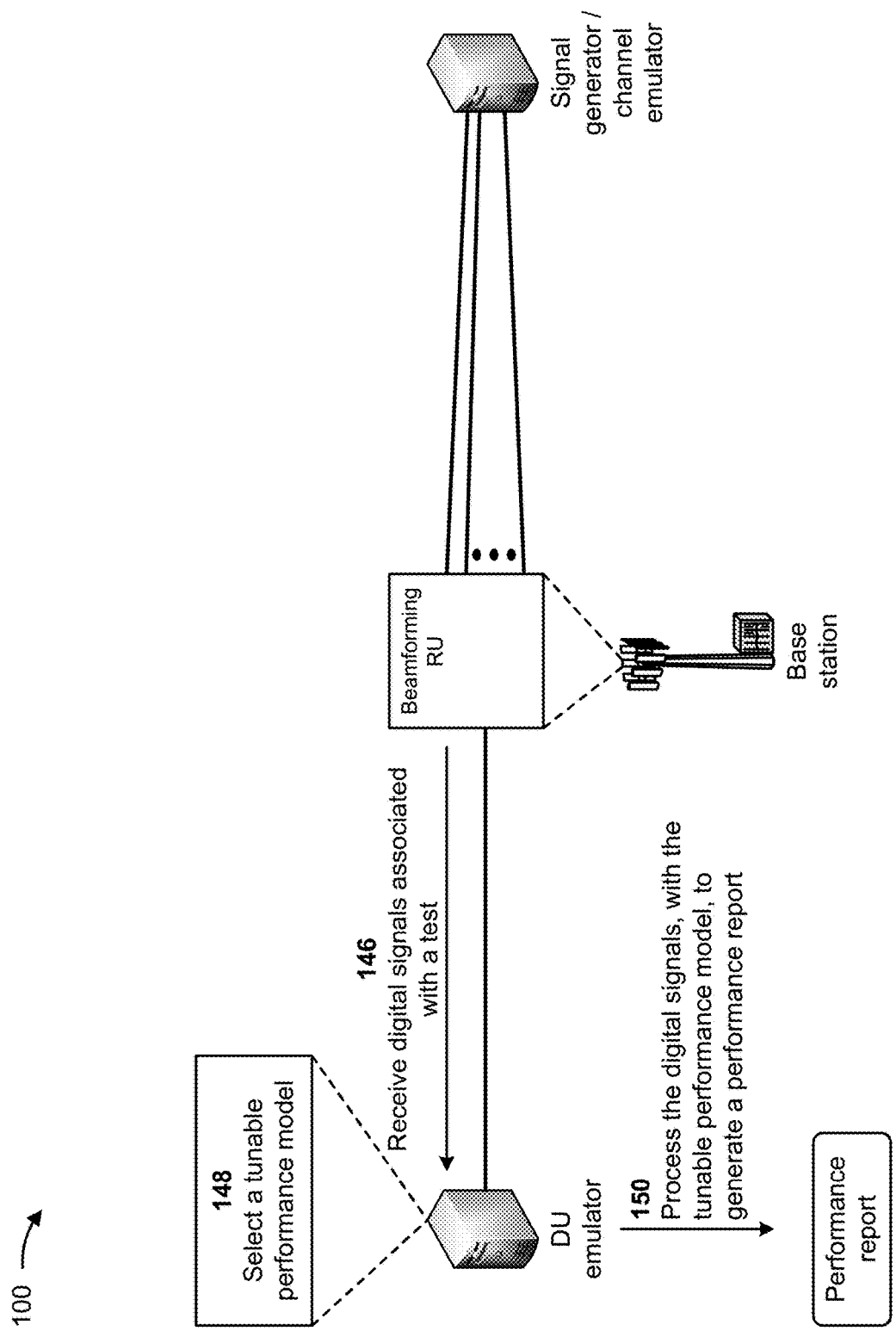

As shown in FIG. 1G, and by reference number 146, the DU emulator may receive digital signals associated with a test. For example, the signal generator/channel emulator may generate channel emulated RF waveforms (e.g., beams) in certain directions, channel emulated RF waveform patterns (e.g., beam patterns) that can simultaneously increase a gain in a certain direction while nulling out interference from another direction, and/or the like. The signal generator/channel emulator may sequentially provide the channel emulated RF waveforms to the ports (e.g., multiple receive antennas) of the RU. The channel emulated RF waveforms may cause the RU to generate digital signals indicating calibrated gains and phases for the channel emulated RF waveforms in certain directions, for channel emulated RF waveform patterns that can simultaneously increase a gain in a certain direction while nulling out interference from another direction, and/or the like. The RU may provide the digital signals to the DU emulator and the DU emulator may receive the digital signals. The digital signals may provide an indication of uplink signaling (e.g., from a UE to the RU).

As further shown in FIG. 1G, and by reference number 148, the DU emulator may select a tunable performance model. For example, the DU emulator may select the tunable performance model from a plurality of tunable performance models, such as a minimum mean square error (MMSE) estimation model, an interference rejection combining (IRC) model, and/or the like. Each of the plurality of tunable performance models may include a set of tunable additional parameters (e.g., specific to the tunable performance model) that may be utilized to execute the tunable performance model based on the digital signals received from the RU.

As further shown in FIG. 1G, and by reference number 150, the DU emulator may process the digital signals, with the tunable performance model, to generate a performance report. For example, the DU emulator may execute the tunable performance model with the digital signals to generate the performance report. The performance report may include a report identifying an uplink direction beamforming performance of the RU. The DU emulator may provide the performance report for display to a user of the DU emulator, to a user device associated with the DU emulator, to a cloud-based device associated with the DU emulator, an external server device associated with the DU emulator, and/or the like. In some implementations, the DU emulator may store the performance report in a data structure (e.g., a database, a table, a list, and/or the like) associated with the DU emulator.

Figure 1H:
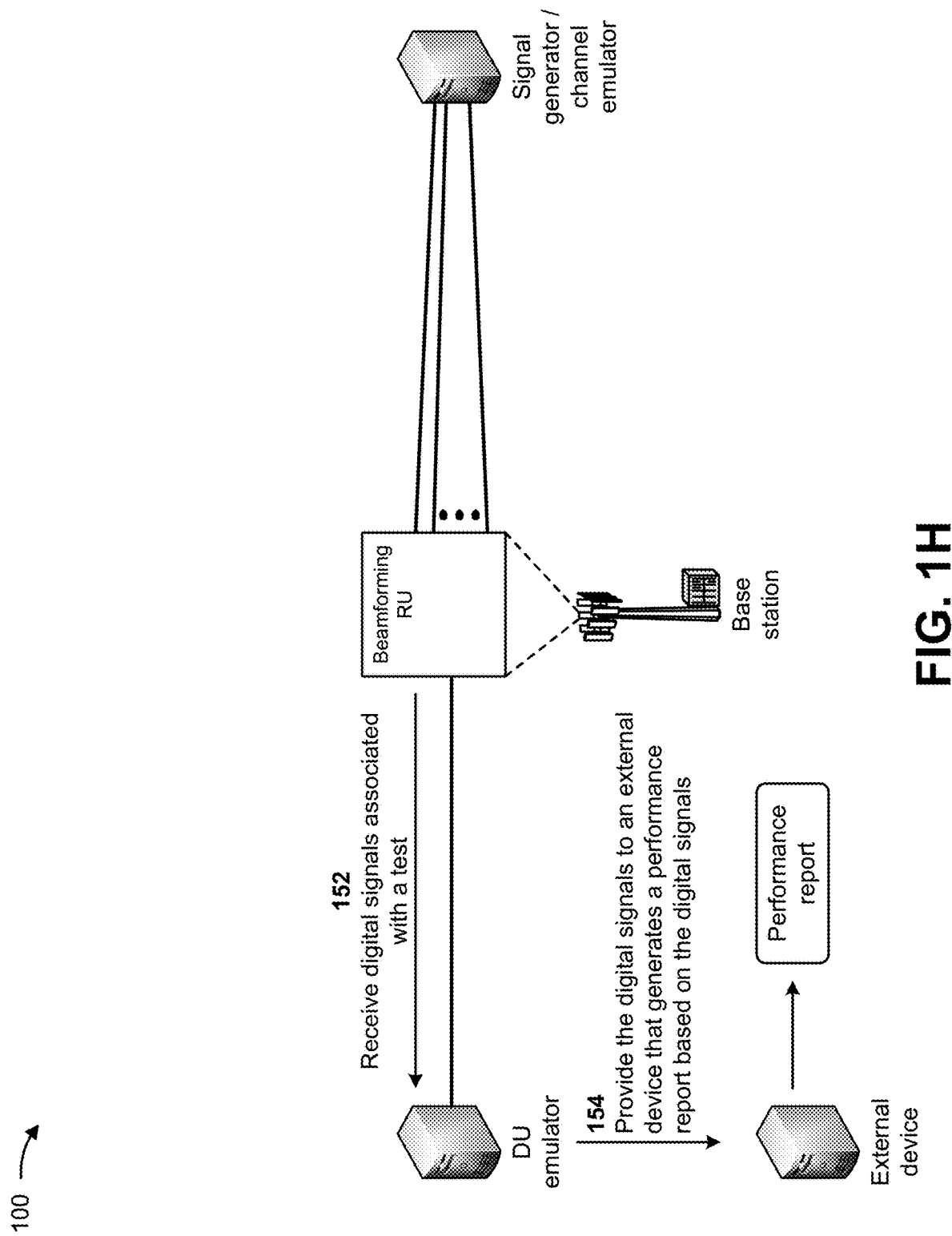

As shown in FIG. 1H, and by reference number 152, the DU emulator may receive digital signals associated with a test. For example, the signal generator/channel emulator may generate channel emulated RF waveforms (e.g., beams) in certain directions, channel emulated RF waveform patterns (e.g., beam patterns) that can simultaneously increase a gain in a certain direction while nulling out interference from another direction, and/or the like. The signal generator/channel emulator may sequentially provide the channel emulated RF waveforms to the ports (e.g., multiple receive antennas) of the RU. The channel emulated RF waveforms may cause the RU to generate digital signals indicating calibrated gains and phases for the channel emulated RF waveforms in certain directions, for channel emulated RF waveform patterns that can simultaneously increase a gain in a certain direction while nulling out interference from another direction, and/or the like. The RU may provide the digital signals to the DU emulator and the DU emulator may receive the digital signals. The digital signals may provide an indication of uplink signaling (e.g., from a UE to the RU).

As further shown in FIG. 1H, and by reference number 154, the DU emulator may provide the digital signals to an external device that generates a performance report based on the digital signals. For example, the DU emulator may provide the digital signals to the external device (e.g., an external user device, server device, cloud-based device, and/or the like). The external device may select a tunable performance model from the plurality of tunable performance models. The external device may process the digital signals, with the tunable performance model, to generate the performance report. The performance report may include a report identifying an uplink direction beamforming performance of the RU. The external device may provide the performance report for display to user of the external device, may store the performance report in a data structure associated with the external device, and/or the like.

Figure 1I:
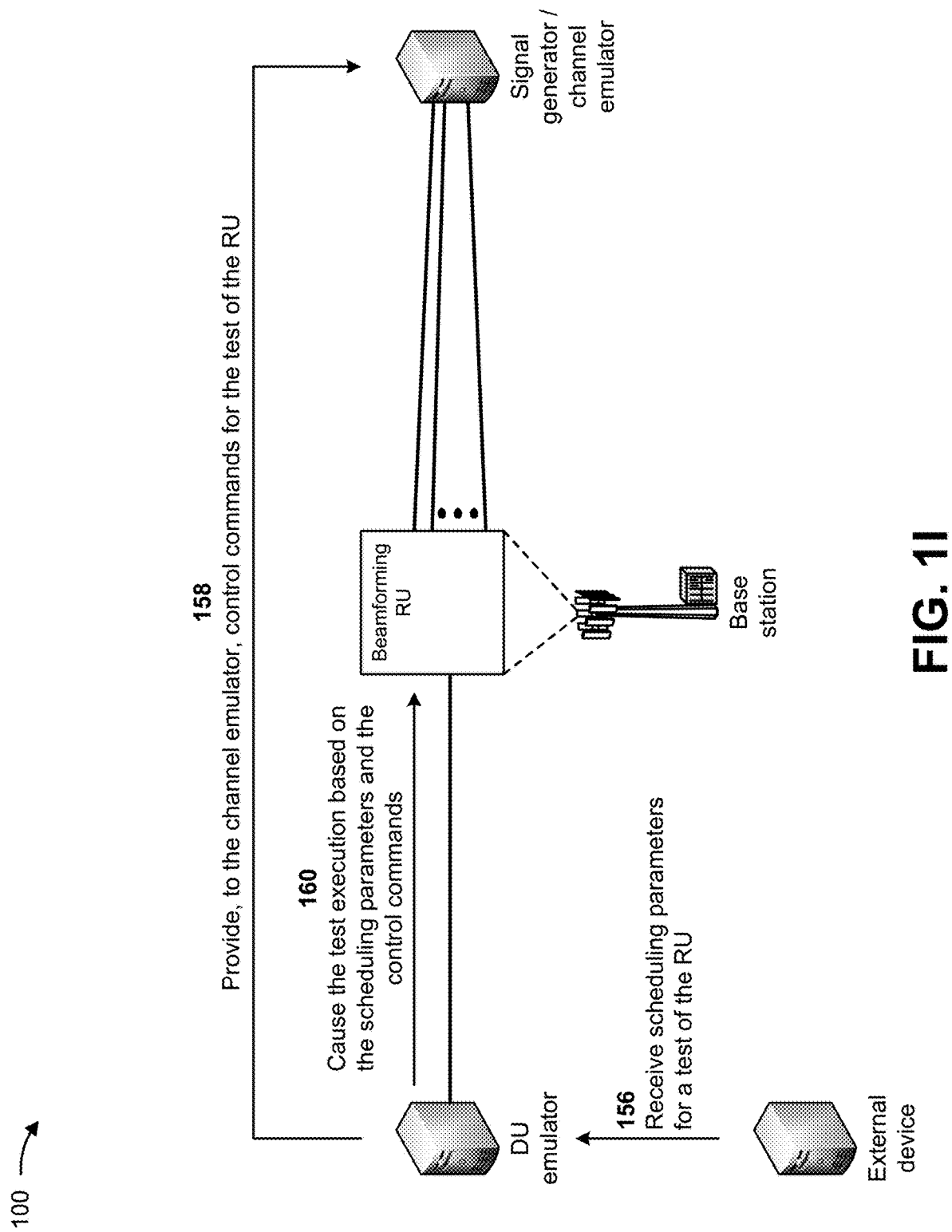

As shown in FIG. 1I, and by reference number 156, the DU emulator may receive scheduling parameters for a test of the RU. For example, an external device may generate the scheduling parameters for the test of the RU, and may provide the scheduling parameters to the DU emulator. The DU emulator may receive the scheduling parameters from the external device. In some implementations, the DU emulator may include a user interface for receiving the scheduling parameters from a user of the DU emulator rather than from the external device. The scheduling parameters may include downlink transmission parameters, such as downlink scheduling transmission, downlink beam weight decisions, and/or the like. Such an arrangement may be utilized when a test involves a real UE or a UE emulator since the arrangement enables evaluation of the RU in a closed loop system where real DU behavior may be emulated on the external device.

As further shown in FIG. 1I, and by reference number 158, the DU emulator may provide, to the signal generator/channel emulator, control commands for the test of the RU. For example, delays associated with exchange of information with the channel emulator and subsequent processing by the external device may occur and affect a performance evaluation. To mitigate this issue, the DU emulator may generate the control commands for the test of the RU. The control commands may include a freeze state command, an unfreeze state command, and/or other state commands that emulate real time performance. The DU emulator may provide the control commands to the signal generator/channel emulator.

As further shown in FIG. 1I, and by reference number 160, the DU emulator may cause the test execution based on the scheduling parameters and the control commands. For example, based on the scheduling parameters and/or the control parameters, the signal generator/channel emulator may execute the test by generating channel emulated RF waveforms (e.g., beams) in certain directions, channel emulated RF waveform patterns (e.g., beam patterns) that can simultaneously increase a gain in a certain direction while nulling out interference from another direction, and/or the like. The signal generator/channel emulator may sequentially provide the channel emulated RF waveforms to the ports (e.g., multiple receive antennas) of the RU. The channel emulated RF waveforms may cause the RU to generate digital signals indicating calibrated gains and phases for the channel emulated RF waveforms in certain directions, for channel emulated RF waveform patterns that can simultaneously increase a gain in a certain direction while nulling out interference from another direction, and/or the like. The RU may provide the digital signals to the DU emulator and the DU emulator may receive the digital signals. The digital signals may provide an indication of uplink signaling (e.g., from a UE to the RU). In some implementations, the DU emulator may generate the performance report based on the digital signals, may provide the digital signals to the external device (e.g., for generation of the performance report), and/or the like.

Figure 1J:
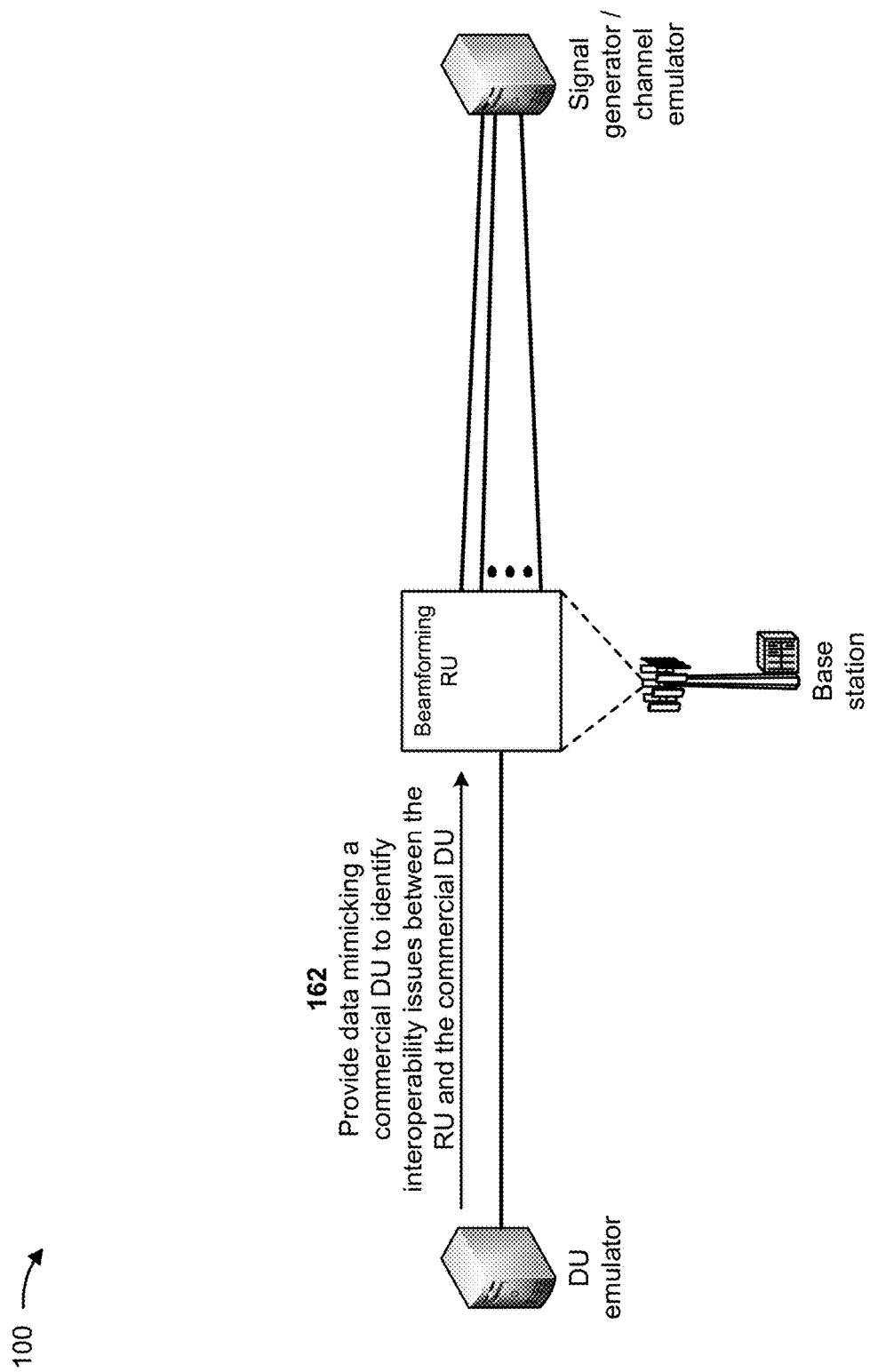

As shown in FIG. 1J, and by reference number 162, the DU emulator may provide data mimicking a commercial DU to identify interoperability issues between the RU and the commercial DU. For example, to test interoperability of the RU with various DUs, the DU emulator may generate the data mimicking a commercial DU, and may provide, to the RU, the data mimicking the commercial DU. This may enable the DU emulator to identify interoperability issues between the RU and the commercial DU, such as issues associated with configuration of a fronthaul interface provided between the RU and a commercial DU. The data mimicking the commercial DU may include data identifying demodulation models, various CUSM plane options, interoperability test profiles which may have an impact on RU performance, synchronized clock performance, compression/decompression models, and/or the like. The data mimicking the commercial DU may be provided by a vendor of the commercial DU, identified as a pre-defined set of parameters in a standard, extracted by using an RU emulator to test the commercial DU, and/or the like.

The DU emulator may be configured to characterize the RU in conditions beyond the set of tests defined in the 3GPP specification. For example, the DU emulator may repeat performance characterization of the RU for a range of parameters (e.g., to be supported by the RU) to highlight performance issues which may have otherwise been missed. For example, the range of parameters may include supported bands, supported bandwidths, supported positions within a bandwidth, a supported range of a nominal transmission power level, supported numerologies, supported multiplexing modes, a supported quantity of component carriers and relative frequency domain positions, a supported range of receive power levels, an ability to handle near-far effect conditions or interference, a DU preferred message type and configuration for different use cases, an RU performance based on a quality of a synchronization clock, performance of different test scenarios while utilizing different compression models, different scenario performance with a different delay budget between the RU and the DU, and/or the like. In some implementations, characterization of the RU may be determined based on testing of the RU beamforming performance for a wide range of downlink and uplink signal levels, a quantity of simultaneous beams and partitioning of available power per beam based on beam weights, a sounding reference signal (SRS) measurement accuracy, an achievable throughput per user beam, and/or the like.

The way in which different commercial DUs utilize different beam groups in the RU and preferred utilization of frequency, time, or hybrid type beamforming for different use cases (e.g., for a particular RU antenna model) may also impact performance of the RU when paired with a commercial DU. In general, there may be several degrees of freedom (e.g., within which the commercial DU may operate) that can significantly impact performance of the RU and a user experience for a user of the RU and DU combination. Characterizing such interactions by mimicking a particular set of behaviors of a commercial DU supports rapid time-to-market for a particular RU and DU combination.

In this way, the testing system tests disaggregated components of a RAN. The testing system may test an RU in isolation to enable verification of conformance, interoperability, and performance of the RU, and to enable early detection of errors and an increased likelihood of passing further tests when a DU-RU pair is tested together. For testing RU beamforming conformance and performance, a single-port signal analyzer/generator may be used, together with a tunable DU emulator that can stimulate each branch of a multi-port RU while still effectively testing the beamforming performance. For testing RF performance requirements of the RU, the DU emulator may include a tunable performance model that enables the DU emulator to draw performance curves related to the RU contribution to the overall combined base station performance. For testing interoperability of the RU with various DUs associated with multiple different vendors and/or manufacturers, the DU emulator may be configured to mimic or simulate the behavior of commercial DUs to identify interoperability issues that may arise when the actual DU and RU pair is tested. This, in turn, conserves computing resources, networking resources, and/or the like that would otherwise have been consumed in conducting tests for different combinations of RUs and DUs and/or different versions of RUs and DUs, generating incorrect test results based on the tests, identifying the incorrect test results and correcting the tests, implementing RUs with interoperability issues with DUs based on the incorrect test results, and/or the like.

As indicated above, FIGS. 1A-1J are provided as an example. Other examples may differ from what is described with regard to FIGS. 1A-1J. The number and arrangement of devices shown in FIGS. 1A-1J are provided as an example. In practice, there may be additional devices, fewer devices, different devices, or differently arranged devices than those shown in FIGS. 1A-1J. Furthermore, two or more devices shown in FIGS. 1A-1J may be implemented within a single device, or a single device shown in FIGS. 1A-1J may be implemented as multiple, distributed devices. Additionally, or alternatively, a set of devices (e.g., one or more devices) shown in FIGS. 1A-1J may perform one or more functions described as being performed by another set of devices shown in FIGS. 1A-1J.

Figure 2:
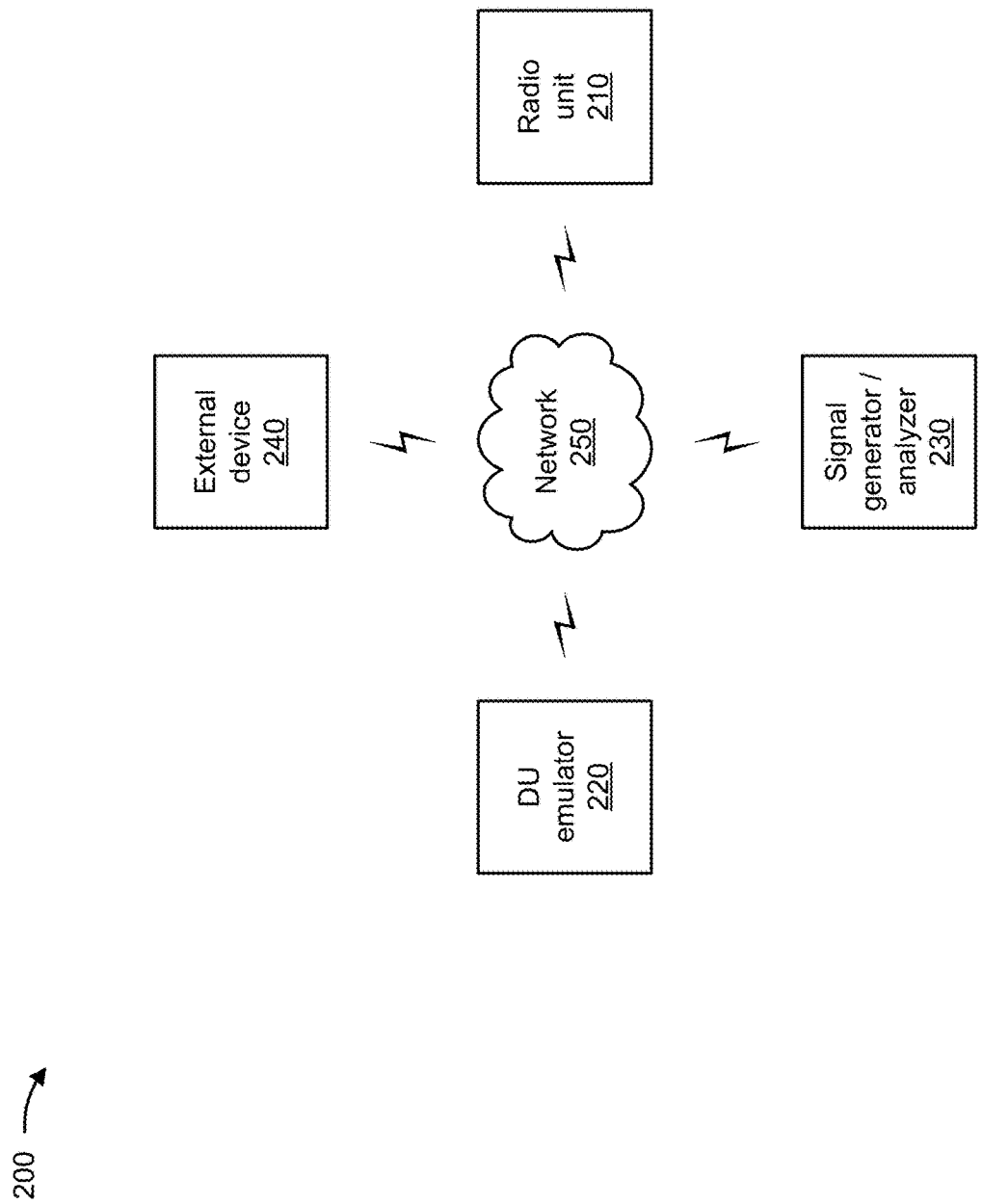
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include a radio unit 210, a DU emulator 220, a signal generator/analyzer 230, an external device 240, and/or a network 250. Devices and/or elements of the environment 200 may interconnect via wired connections and/or wireless connections.

In some implementations, the RU 210 and the DU emulator 220 may be implemented according to a functional split architecture in which functionality of a base station (e.g., an eNodeB (eNB) or a gNodeB (gNB)) is provided by one or more RUs 210 and the DU emulator 220 that communicate over a fronthaul link. In some implementations, the RU 210 and the DU emulator 220 may communicate via a fronthaul link to exchange real-time control plane information via a lower layer split (LLS) control plane (LLS-C) interface, to exchange non-real-time management information via an LLS management plane (LLS-M) interface, and/or to exchange user plane information via an LLS user plane (LLS-U) interface.

The RU 210 may correspond to a logical node that hosts RF processing functions and low-PHY layer functions (e.g., a fast Fourier transform (FFT), an inverse FFT (iFFT), digital beamforming, physical random access channel (PRACH) extraction and filtering) based at least in part on the lower layer functional split, data compression and/or decompression models, and/or the like. Accordingly, in an open radio access network (O-RAN) architecture, the RU 210 may handle all over-the-air (OTA) communication with a UE, and real-time and non-real-time aspects of control and user plane communication with the RU 210 are controlled by a corresponding DU, which enables the DU to be implemented in a cloud-based RAN architecture.

The DU emulator 220 may correspond to a logical unit that simulates one or more base station functions to control the operation of the RU 210. For example, in some implementations, the DU emulator 220 may host a radio link control (RLC) layer, a medium access control (MAC) layer, one or more high physical (PHY) layers (e.g., forward error correction (FEC) encoding and decoding, scrambling, and/or modulation and demodulation) based at least in part on a lower layer functional split, data compression and/or decompression models, and/or the like.

The signal generator/analyzer 230 includes one or more devices capable of receiving, generating, storing, processing, and/or providing information, as described elsewhere herein. The signal generator/analyzer 230 may include a communication device and/or a computing device. For example, the signal generator/analyzer 230 may include a device that simulates a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The external device 240 may include one or more devices capable of receiving, generating, storing, processing, providing, and/or routing information, as described elsewhere herein. The external device 240 may include a communication device and/or a computing device. For example, the external device 240 may include a server, such as an application server, a client server, a web server, a database server, a host server, a proxy server, a virtual server (e.g., executing on computing hardware), or a server in a cloud computing system. In some implementations, the external device 240 may include computing hardware used in a cloud computing environment.

The network 250 includes one or more wired and/or wireless networks. For example, the network 250 may include a cellular network, a public land mobile network (PLMN), a local area network (LAN), a wide area network (WAN), a private network, the Internet, an RF switch, and/or the like, and/or a combination of these or other types of networks. The network 250 enables communication among the devices of the environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
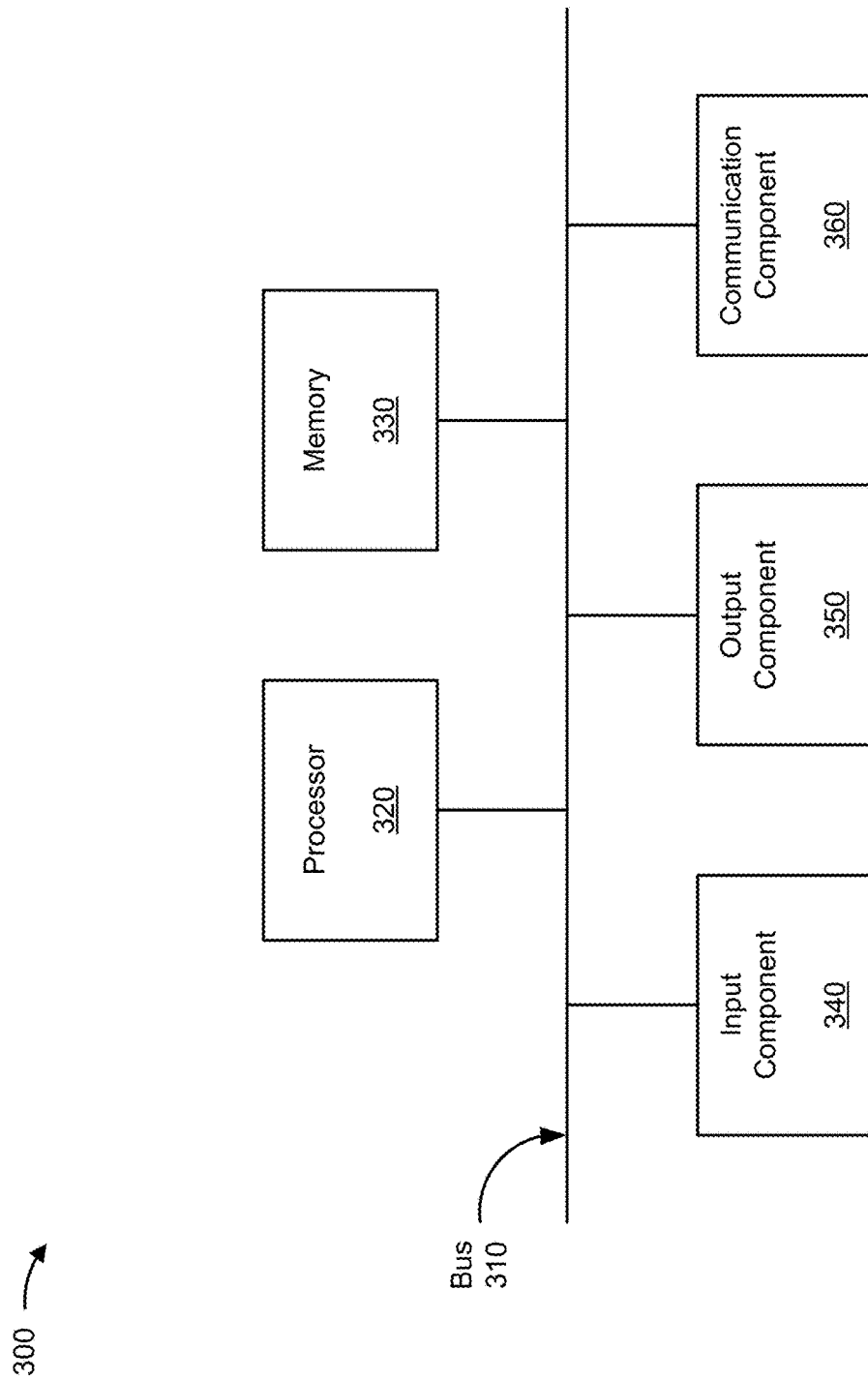
FIG. 3 is a diagram of example components of one or more devices of FIG. 2.

FIG. 3 is a diagram of example components of a device 300, which may correspond to the radio unit 210, the DU emulator 220, the signal generator/analyzer 230, and/or the external device 240. In some implementations, the radio unit 210, the DU emulator 220, the signal generator/analyzer 230, and/or the external device 240 may include one or more devices 300 and/or one or more components of the device 300. As shown in FIG. 3, the device 300 may include a bus 310, a processor 320, a memory 330, an input component 340, an output component 350, and a communication interface 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication interface 360 enables the device 300 to communicate with other devices via a wired connection and/or a wireless connection. For example, the communication interface 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
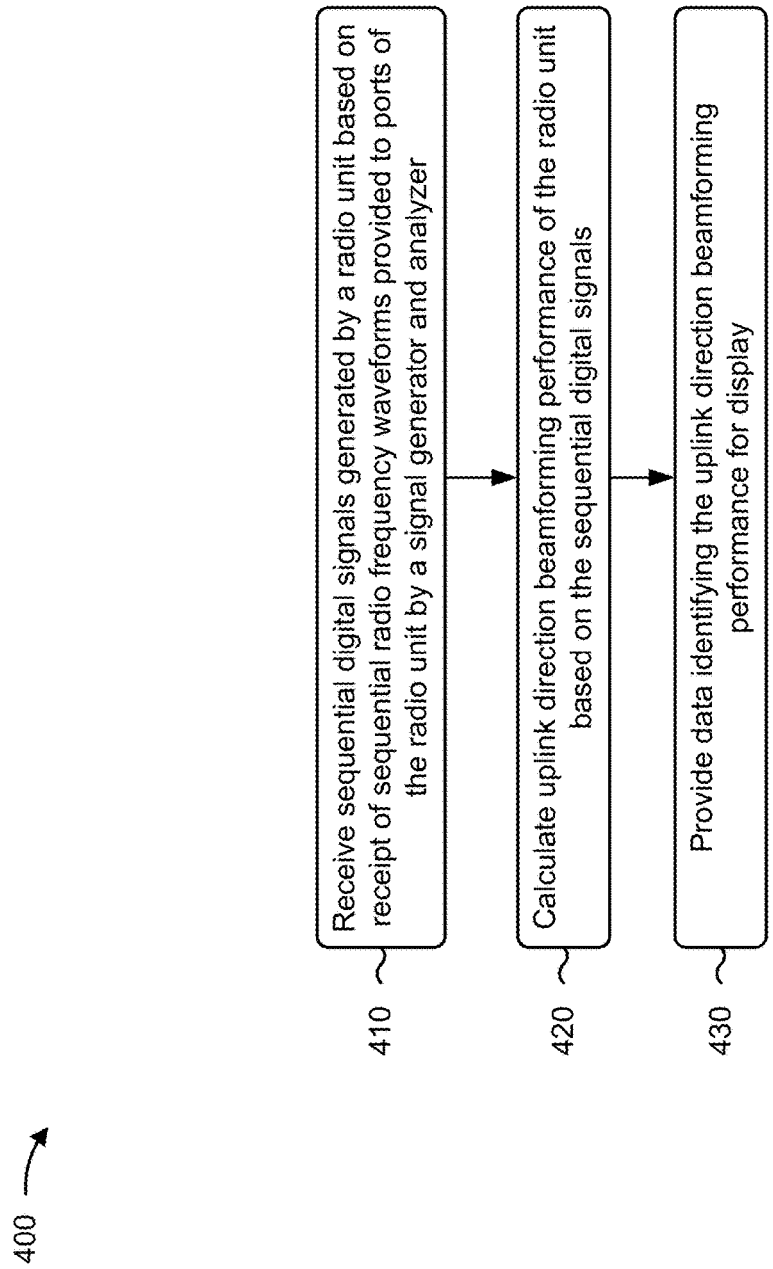
FIG. 4 is a flowchart of an example process for testing disaggregated components of a RAN.

FIG. 4 is a flowchart of an example process 400 for testing disaggregated components of a RAN. In some implementations, one or more process blocks of FIG. 4 may be performed by a device (e.g., the DU emulator 220 and/or the signal generator/analyzer 230). In some implementations, one or more process blocks of FIG. 4 may be performed by another device or a group of devices separate from or including the device, such as an external device (e.g., the external device 240). Additionally, or alternatively, one or more process blocks of FIG. 4 may be performed by one or more components of the device 300, such as the processor 320, the memory 330, the input component 340, the output component 350, and/or the communication interface 360.

As shown in FIG. 4, process 400 may include receiving sequential digital signals generated by a radio unit based on receipt of sequential radio frequency waveforms provided to ports of the radio unit by a signal generator and analyzer (block 410). For example, the device may receive sequential digital signals generated by a radio unit based on receipt of sequential radio frequency waveforms provided to ports of the radio unit by a signal generator and analyzer, as described above. In some implementations, the device is a distributed unit emulator. In some implementations, the radio unit is one of a beamforming radio unit or a channel information-based beamforming radio unit.

As further shown in FIG. 4, process 400 may include calculating uplink direction beamforming performance of the radio unit based on the sequential digital signals (block 420). For example, the device may calculate uplink direction beamforming performance of the radio unit based on the sequential digital signals, as described above.

As further shown in FIG. 4, process 400 may include providing data identifying the uplink direction beamforming performance for display (block 430). For example, the device may provide data identifying the uplink direction beamforming performance for display, as described above.

In some implementations, process 400 includes providing, to the radio unit, digital signals to cause the radio unit to generate radio frequency waveforms. The signal generator and analyzer is configured to sequentially receive the radio frequency waveforms from the ports of the radio unit and to calculate downlink direction beamforming performance of the radio unit based on the radio frequency waveforms.

In some implementations, process 400 includes providing, to the radio unit, digital signals to cause the radio unit to generate channel emulated radio frequency waveforms, and providing channel emulation data to a channel emulator. The channel emulator is configured to receive the channel emulated radio frequency waveforms from the ports of the radio unit and to generate radio frequency waveforms based on the channel emulated radio frequency waveforms and the channel emulation data. The signal generator and analyzer is configured to receive the radio frequency waveforms from the channel emulator and to calculate downlink direction beamforming performance of the radio unit based on the radio frequency waveforms.

In some implementations, process 400 includes providing channel emulation data to a channel emulator associated with the signal generator and analyzer, wherein the signal generator and analyzer is configured to sequentially provide, via the channel emulator and based on the channel emulation data, channel emulated radio frequency waveforms to the ports of the radio unit to cause the radio unit to generate additional sequential digital signals. Process 400 further includes receiving the additional sequential digital signals from the radio unit, calculating another uplink direction beamforming performance of the radio unit based on the additional sequential digital signals and the channel emulation data, and providing data identifying the other uplink direction beamforming performance for display.

In some implementations, process 400 includes providing channel emulation data to a programmable switch associated with the signal generator and analyzer, and providing, to the radio unit, digital signals to cause the radio unit to generate channel emulated radio frequency waveforms. The programmable switch is configured to receive the channel emulated radio frequency waveforms from the ports of the radio unit and to generate radio frequency waveforms based on the channel emulated radio frequency waveforms and the channel emulation data. The signal generator and analyzer is configured to receive the radio frequency waveforms from the programmable switch and to calculate downlink direction beamforming performance of the radio unit based on the radio frequency waveforms.

In some implementations, process 400 includes providing channel emulation data to a programmable switch associated with the signal generator and analyzer, wherein the signal generator and analyzer is configured to sequentially provide, via the programmable switch and based on the channel emulation data, channel emulated radio frequency waveforms to the ports of the radio unit to cause the radio unit to generate additional sequential digital signals. Process 400 further includes receiving the additional sequential digital signals from the radio unit, calculating another uplink direction beamforming performance of the radio unit based on the additional sequential digital signals and the channel emulation data, and providing data identifying the other uplink direction beamforming performance for display.

In some implementations, process 400 includes receiving, from the radio unit, digital signals associated with a test of the radio unit, selecting a tunable performance model from a plurality of tunable performance models, processing the digital signals, with the tunable performance model, to generate a performance report for the radio unit, and providing the performance report for display.

In some implementations, process 400 includes receiving digital signals associated with a test of the radio unit, and providing the digital signals to an external device to cause the external device to generate a performance report for the radio unit based on the digital signals. In some implementations, process 400 includes receiving scheduling parameters for a test of the radio unit, providing, to the signal generator and analyzer, control commands for the test of the radio unit, and causing the test to be executed based on the scheduling parameters and the control commands.

In some implementations, process 400 includes receiving, from the radio unit, digital signals associated with execution of the test of the radio unit, selecting a tunable performance model from a plurality of tunable performance models, processing the digital signals, with the tunable performance model, to generate a performance report for the radio unit, and providing the performance report for display. In some implementations, process 400 includes providing, to the radio unit, data mimicking a commercial distributed unit to cause the radio unit to execute an interoperability test between the commercial distributed unit and the radio unit, receiving results of the interoperability test, and identifying interoperability issues between the radio unit and the commercial distributed unit based on the results.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a device, sequential digital signals generated by a radio unit based on receipt of sequential radio frequency waveforms provided to ports of the radio unit by a signal generator and analyzer;
   calculating, by the device, uplink direction beamforming performance of the radio unit based on the sequential digital signals; and providing, by the device, data identifying the uplink direction beamforming performance for display.

2. The method of claim 1, further comprising:
providing, to the radio unit, digital signals to cause the radio unit to generate radio frequency waveforms,
   wherein the signal generator and analyzer is configured to sequentially receive the radio frequency waveforms from the ports of the radio unit and to calculate downlink direction beamforming performance of the radio unit based on the radio frequency waveforms.

3. The method of claim 1, further comprising:
providing, to the radio unit, digital signals to cause the radio unit to generate channel emulated radio frequency waveforms; and
providing channel emulation data to a channel emulator,
   wherein the channel emulator is configured to receive the channel emulated radio frequency waveforms from the ports of the radio unit and to generate radio frequency waveforms based on the channel emulated radio frequency waveforms and the channel emulation data, and
   wherein the signal generator and analyzer is configured to receive the radio frequency waveforms from the channel emulator and to calculate downlink direction beamforming performance of the radio unit based on the radio frequency waveforms.

4. The method of claim 1, further comprising:
providing channel emulation data to a channel emulator associated with the signal generator and analyzer,
   wherein the signal generator and analyzer is configured to sequentially provide, via the channel emulator and based on the channel emulation data, channel emulated radio frequency waveforms to the ports of the radio unit to cause the radio unit to generate additional sequential digital signals;
receiving the additional sequential digital signals from the radio unit;
calculating another uplink direction beamforming performance of the radio unit based on the additional sequential digital signals and the channel emulation data; and
providing data identifying the other uplink direction beamforming performance for display.

5. The method of claim 1, further comprising:
providing channel emulation data to a programmable switch associated with the signal generator and analyzer; and
providing, to the radio unit, digital signals to cause the radio unit to generate channel emulated radio frequency waveforms,
   wherein the programmable switch is configured to receive the channel emulated radio frequency waveforms from the ports of the radio unit and to generate radio frequency waveforms based on the channel emulated radio frequency waveforms and the channel emulation data, and
   wherein the signal generator and analyzer is configured to receive the radio frequency waveforms from the programmable switch and to calculate downlink direction beamforming performance of the radio unit based on the radio frequency waveforms.

6. The method of claim 1, further comprising:
providing channel emulation data to a programmable switch associated with the signal generator and analyzer,
   wherein the signal generator and analyzer is configured to sequentially provide, via the programmable switch and based on the channel emulation data, channel emulated radio frequency waveforms to the ports of the radio unit to cause the radio unit to generate additional sequential digital signals;
receiving the additional sequential digital signals from the radio unit;
calculating another uplink direction beamforming performance of the radio unit based on the additional sequential digital signals and the channel emulation data; and
providing data identifying the other uplink direction beamforming performance for display.

7. The method of claim 1, further comprising:
receiving, from the radio unit, digital signals associated with a test of the radio unit;
selecting a tunable performance model from a plurality of tunable performance models;
processing the digital signals, with the tunable performance model, to generate a performance report for the radio unit; and
providing the performance report for display.

8. A device, comprising:
one or more memories; and
one or more processors, coupled to the one or more memories, configured to:
   receive sequential digital signals generated by a radio unit based on receipt of sequential radio frequency waveforms provided to ports of the radio unit by a signal generator and analyzer;
   calculate uplink direction beamforming performance of the radio unit based on the sequential digital signals;
   generate a performance report based on the uplink direction beamforming performance; and
   provide the performance report for display.

9. The radio unit of claim 8, wherein the one or more processors are further configured to:
receive digital signals associated with a test of the radio unit; and
provide the digital signals to an external device to cause the external device to generate a performance report for the radio unit based on the digital signals.

10. The device of claim 8, wherein the one or more processors are further configured to:
receive scheduling parameters for a test of the radio unit;
provide, to the signal generator and analyzer, control commands for the test of the radio unit; and
cause the test to be executed based on the scheduling parameters and the control commands.

11. The device of claim 10, wherein the one or more processors are further configured to:
receive, from the radio unit, digital signals associated with execution of the test of the radio unit;
select a tunable performance model from a plurality of tunable performance models;
process the digital signals, with the tunable performance model, to generate a performance report for the radio unit; and
provide the performance report for display.

12. The device of claim 8, wherein the one or more processors are further configured to:
provide, to the radio unit, data mimicking a commercial distributed unit to cause the radio unit to execute an interoperability test between the commercial distributed unit and the radio unit;
receive results of the interoperability test; and
identify interoperability issues between the radio unit and the commercial distributed unit based on the results.

13. The device of claim 8, wherein the device is a distributed unit emulator.

14. The device of claim 8, wherein the radio unit is one of a beamforming radio unit or a channel information-based beamforming radio unit.

15. A non-transitory computer-readable medium storing a set of instructions, the set of instructions comprising:
one or more instructions that, when executed by one or more processors of a device, cause the device to:
receive sequential digital signals generated by a radio unit based on receipt of sequential radio frequency waveforms provided to ports of the radio unit by a signal generator and analyzer,
wherein the radio unit is one of a beamforming radio unit or a channel information-based beamforming radio unit;
calculate uplink direction beamforming performance of the radio unit based on the sequential digital signals; and
provide data identifying the uplink direction beamforming performance for display.

16. The non-transitory computer-readable medium of claim 15, wherein the one or more instructions further cause the device to:
provide, to the radio unit, digital signals to cause the radio unit to generate radio frequency waveforms,
wherein the signal generator and analyzer is configured to sequentially receive the radio frequency waveforms from the ports of the radio unit and to calculate downlink direction beamforming performance of the radio unit based on the radio frequency waveforms.

17. The non-transitory computer-readable medium of claim 15, wherein the one or more instructions further cause the device to:
provide, to the radio unit, digital signals to cause the radio unit to generate channel emulated radio frequency waveforms; and
provide channel emulation data to a channel emulator,
wherein the channel emulator is configured to receive the channel emulated radio frequency waveforms from the ports of the radio unit and to generate radio frequency waveforms based on the channel emulated radio frequency waveforms and the channel emulation data, and
wherein the signal generator and analyzer is configured to receive the radio frequency waveforms from the channel emulator and to calculate downlink direction beamforming performance of the radio unit based on the radio frequency waveforms.

18. The non-transitory computer-readable medium of claim 15, wherein the one or more instructions further cause the device to:
provide channel emulation data to a channel emulator associated with the signal generator and analyzer,
wherein the signal generator and analyzer is configured to sequentially provide, via the channel emulator and based on the channel emulation data, channel emulated radio frequency waveforms to the ports of the radio unit to cause the radio unit to generate additional sequential digital signals;
receive the additional sequential digital signals from the radio unit;
calculate another uplink direction beamforming performance of the radio unit based on the additional sequential digital signals and the channel emulation data; and
provide data identifying the other uplink direction beamforming performance for display.

19. The non-transitory computer-readable medium of claim 15, wherein the one or more instructions further cause the device to:
provide channel emulation data to a programmable switch associated with the signal generator and analyzer; and
provide, to the radio unit, digital signals to cause the radio unit to generate channel emulated radio frequency waveforms,
wherein the programmable switch is configured to receive the channel emulated radio frequency waveforms from the ports of the radio unit and to generate radio frequency waveforms based on the channel emulated radio frequency waveforms and the channel emulation data, and
wherein the signal generator and analyzer is configured to receive the radio frequency waveforms from the programmable switch and to calculate downlink direction beamforming performance of the radio unit based on the radio frequency waveforms.

20. The non-transitory computer-readable medium of claim 15, wherein the one or more instructions further cause the device to:
provide channel emulation data to a programmable switch associated with the signal generator and analyzer,
wherein the signal generator and analyzer is configured to sequentially provide, via the programmable switch and based on the channel emulation data, channel emulated radio frequency waveforms to the ports of the radio unit to cause the radio unit to generate additional sequential digital signals;
receive the additional sequential digital signals from the radio unit;
calculate another uplink direction beamforming performance of the radio unit based on the additional sequential digital signals and the channel emulation data; and
provide data identifying the other uplink direction beamforming performance for display.

\* \* \* \* \*